US010409597B2

(12) United States Patent
Leslie-Hurd et al.

(10) Patent No.: US 10,409,597 B2
(45) **Date of Patent: *Sep. 10, 2019**

(54) MEMORY MANAGEMENT IN SECURE ENCLAVES

(71) Applicant: Intel Corporation, Santa Clara, CA (US)

(72) Inventors: Rebekah Leslie-Hurd, Portland, OR (US); Carlos V. Rozas, Portland, OR (US); Vincent R. Scarlata, Beaverton, OR (US); Simon P. Johnson, Beaverton, OR (US); Uday R. Savagaonkar, Portland, OR (US); Barry E. Huntley, Hillsboro, OR (US); Vedvyas Shanbhogue, Austin, TX (US); Ittai Anati, Haifa (IL); Francis X. Mckeen, Portland, OR (US); Michael A. Goldsmith, Lake Oswego, OR (US); Ilya Alexandrovich, Haifa (IL); Alex Berenzon, Zikhron Ya'akov (IL); Wesley H. Smith, Raleigh, NC (US); Gilbert Neiger, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,573

(22) Filed: May 7, 2018

(65) Prior Publication Data

US 2018/0329707 A1 Nov. 15, 2018

Related U.S. Application Data

(63) Continuation of application No. 15/683,331, filed on Aug. 22, 2017, now Pat. No. 9,990,197, which is a
(Continued)

(51) Int. Cl.
*G06F 12/00* (2006.01)
*G06F 9/30* (2018.01)
(Continued)

(52) U.S. Cl.
CPC ........ *G06F 9/3004* (2013.01); *G06F 9/30047* (2013.01); *G06F 9/30076* (2013.01);
(Continued)

(58) Field of Classification Search
CPC ............... G06F 9/3004; G06F 9/30047; G06F 12/0875; G06F 9/30076
See application file for complete search history.

(56) References Cited

U.S. PATENT DOCUMENTS

2005/0100163 A1 5/2005 Buer
2007/0277223 A1 11/2007 Datta et al.
2012/0159184 A1 6/2012 Johnson et al.

FOREIGN PATENT DOCUMENTS

CN 1677922 A 10/2005
CN 102473224 A 5/2012
(Continued)

OTHER PUBLICATIONS

Abandonment from U.S. Appl. No. 13/729,371, dated Dec. 1, 2016, 1 Page.
(Continued)

*Primary Examiner* — Gurtej Bansal
(74) *Attorney, Agent, or Firm* — Nicholson De Vos Webster & Elliott LLP

(57) ABSTRACT

Embodiments of an invention for memory management in secure enclaves are disclosed. In one embodiment, a processor includes an instruction unit and an execution unit. The instruction unit is to receive a first instruction and a second instruction. The execution unit is to execute the first instruction, wherein execution of the first instruction
(Continued)

Secure Enclave Unit 200
Encryption Unit 210
Access Control Unit 214
Range Registers 216
EPC 220
Page 222
Version Array Page 224
EPCM 240
PENDING bit 242
MODIFIED bit 244
EPC MMU 230
EADD instruction 231
EAUG instruction 232
EMOD instruction 233
EACCEPT instruction 234
EREMOVE instruction 235 includes allocating a page in an enclave page cache to a secure enclave. The execution unit is also to execute the second instruction, wherein execution of the second instruction includes confirming the allocation of the page.

12 Claims, 3 Drawing Sheets

Related U.S. Application Data continuation of application No. 15/074,573, filed on Mar. 18, 2016, now Pat. No. 9,766,889, which is a continuation of application No. 13/729,371, filed on Dec. 28, 2012, now Pat. No. 9,747,102.

(51) Int. Cl.

| | |
|---|---|
| ***G06F 12/0875*** | (2016.01) |
| ***G06F 9/44*** | (2018.01) |
| ***G06F 12/084*** | (2016.01) |
| ***G06F 12/14*** | (2006.01) |

(52) U.S. Cl.

CPC .............. *G06F 9/44* (2013.01); *G06F 12/084* (2013.01); *G06F 12/0875* (2013.01); *G06F 12/1483* (2013.01); *G06F 2212/452* (2013.01)

(56) References Cited

FOREIGN PATENT DOCUMENTS

| | | | |
|---|---|---|---|
| WO | 2010057065 | A2 | 5/2010 |
| WO | 2011078855 | A1 | 6/2011 |
| WO | 2012087562 | A2 | 6/2012 |
| WO | 2014105161 | A1 | 7/2014 |

OTHER PUBLICATIONS

International Preliminary Report on Patentability received for PCT Patent Application No. PCT/US2013/047339, dated Jul. 9, 2015, 8 pages.

International Search Report and Written Opinion received for PCT Patent Application No. PCT/US2013/047339, dated Nov. 18, 2013, 11 pages.

Non-final Office Action from U.S. Appl. No. 13/729,371, dated Jul. 17, 2015, 13 pages.

Non-final Office Action from U.S. Appl. No. 15/074,573, dated May 2, 2016, 11 pages.

Non-Final Office Action from U.S. Appl. No. 15/683,331, dated Oct. 13, 2017, 15 pages.

Notice of Allowance from U.S. Appl. No. 13/729,371, dated Aug. 15, 2016, 6 pages.

Notice of Allowance from U.S. Appl. No. 13/729,371, dated Oct. 30, 2015, 9 pages.

Notice of Allowance from U.S. Appl. No. 15/074,573, dated Jan. 27, 2017, 10 pages.

Notice of Allowance from U.S. Appl. No. 15/074,573, dated May 22, 2017, 9 pages.

Notice of Allowance from U.S. Appl. No. 15/074,573, dated Sep. 19, 2016, 9 pages.

Notice of Allowance from U.S. Appl. No. 15/683,331, dated Feb. 20, 2018, 9 pages.

Notice on Grant of Patent Right for Invention from foreign counterpart Chinese Patent Application No. 2013860646.2, dated Jan. 11, 2018, 4 pages.

Office Action from foreign counterpart Chinese Patent Application No. 2013860646.2, dated Dec. 22, 2016, 23 pages.

Second Office Action from foreign counterpart Chinese Patent Application No. 2013860646.2, dated Jun. 14, 2017, 7 pages.

System 100
System Memory 120
Information Storage Device 130
Processor 110
Instruction Unit 111
Execution Unit 112
Processing Storage 113
Interface Unit 114
Processor Control Unit 115
Cache Unit 116
Secure Enclave Unit 117

Secure Enclave Unit 200
EPC MMU 230
EADD instruction 231
EAUG instruction 232
EMOD instruction 233
EACCEPT instruction 234
EREMOVE instruction 235
EPC 220
Page 222
Version Array Page 224
EPCM 240
PENDING bit 242
MODIFIED bit 244
Encryption Unit 210
Access Control Unit 214
Range Registers 216

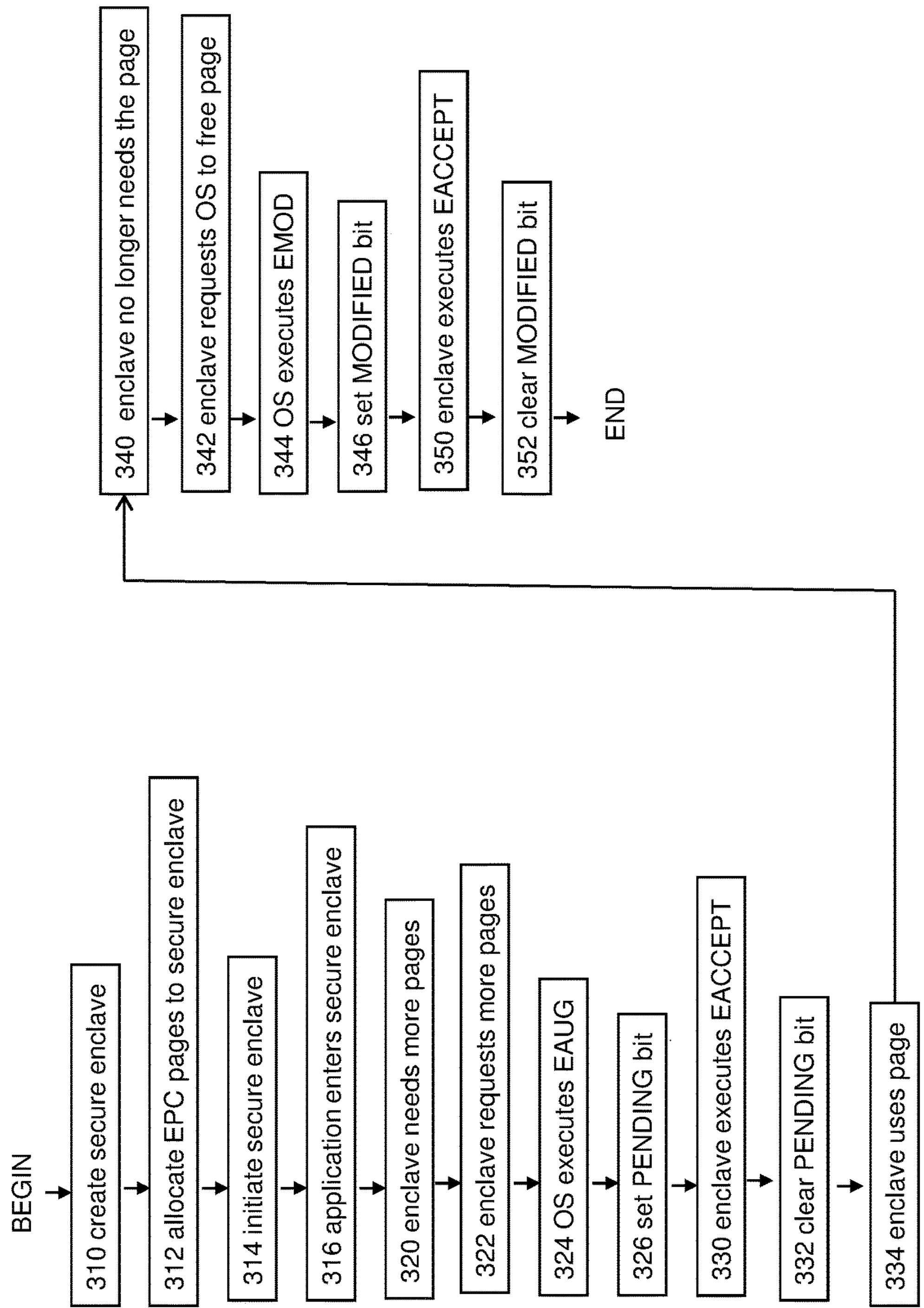
FIGURE 3
METHOD 300
BEGIN
310 create secure enclave
312 allocate EPC pages to secure enclave
314 initiate secure enclave
316 application enters secure enclave
320 enclave needs more pages
322 enclave requests more pages
324 OS executes EAUG
326 set PENDING bit
330 enclave executes EACCEPT
332 clear PENDING bit
334 enclave uses page
340 enclave no longer needs the page
342 enclave requests OS to free page
344 OS executes EMOD
346 set MODIFIED bit
350 enclave executes EACCEPT
352 clear MODIFIED bit
END

MEMORY MANAGEMENT IN SECURE ENCLAVES

BACKGROUND

Field

The present disclosure pertains to the field of information processing, and more particularly, to the field of security in information processing systems.

Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated partition or environment within an information processing system.

BRIEF DESCRIPTION OF THE FIGURES

The present invention is illustrated by way of example and not limitation in the accompanying figures.

FIG. 3 illustrates a method for memory management in secure enclaves according to an embodiment of the present invention.

DETAILED DESCRIPTION

Figure 1:
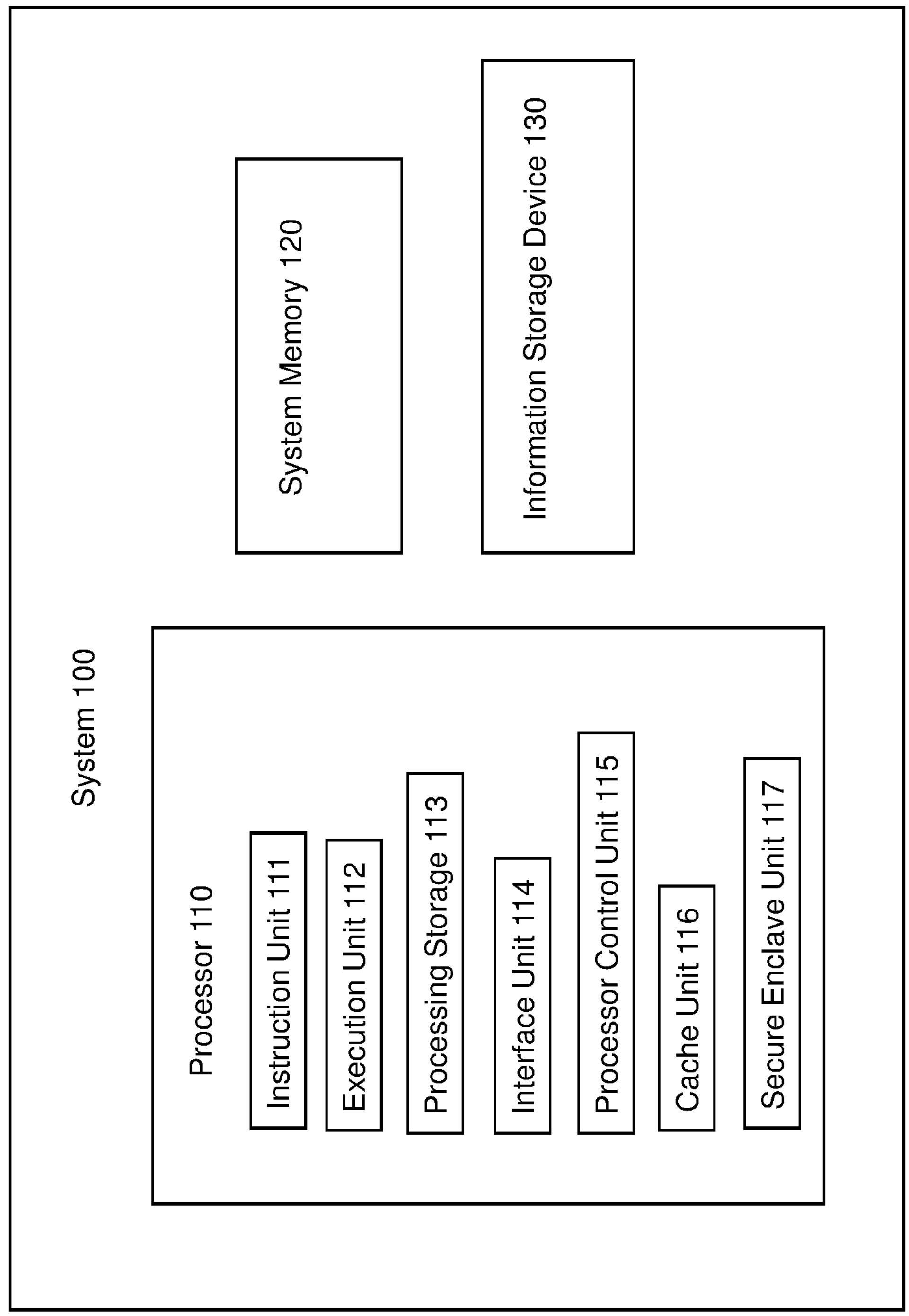
FIG. 1 illustrates a system including memory management in secure enclaves according to an embodiment of the present invention.

Embodiments of an invention for memory management in secure enclaves are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bits," "flags," "fields," "entries," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As described in the background section, various approaches to creating and maintaining a secured, protected, or isolated partition or environment within an information processing system have been developed. One such approach involves secure enclaves as described in the co-pending U.S. patent application entitled "Method and Apparatus to Provide Secure Application Execution," filed Jun. 19, 2012, Ser. No. 13/527,547, which is hereby incorporated by reference as an example of at least one embodiment of a secure enclave. However, the incorporated reference is not intended to limit the scope of embodiments of the invention in any way and other embodiments may be used while remaining within the spirit and scope of the invention.

FIG. 1 illustrates system 100, an information processing system including paging in secure enclaves according to an embodiment of the present invention. System 100 may represent any type of information processing system, such as a server, a desktop computer, a portable computer, a set-top box, a hand-held device, or an embedded control system. System 100 includes processor 110, system memory 120, and information storage device 130. Systems embodying the present invention may include any number of each of these components and any other components or other elements, such as information storage devices, peripherals, and input/output devices. Any or all of the components or other elements in this or any system embodiment, may be connected, coupled, or otherwise in communication with each other through any number of buses, point-to-point, or other wired or wireless interfaces or connections, unless specified otherwise.

System memory 120 may be dynamic random access memory or any other type of medium readable by processor 110. Information storage device 130 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller. Processor 110 may include instruction unit 111, execution unit 112, processing storage 113, interface unit 114, processor control unit 115, cache unit 116, and secure enclave unit 117. Processor 110 may also include any other circuitry, structures, or logic not shown in FIG. 1, and/or any circuitry, structures, or logic shown or described as elsewhere in FIG. 1.

Instruction unit 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution unit 112.

Execution unit 112 may include any circuitry, structure, or other hardware, such as an arithmetic unit, logic unit, floating point unit, shifter, etc., for processing data and executing instructions, micro-instructions, and/or micro-operations.

Processing storage 113 may represent any type of storage usable for any purpose within processor 110; for example, it may include any number of data registers, instruction registers, status registers, configuration registers, control registers, other programmable or hard-coded registers or register files, or any other storage structures.

Interface unit 114 may represent any circuitry, structure, or other hardware, such as a bus unit, messaging unit, or any other unit, port, or interface, to allow processor 110 to communicate with other components in system 100 through any type of bus, point to point, or other connection, directly or through any other component, such as a memory controller or a bus bridge.

Processor control unit 115 may include any logic, microcode, circuitry, or other hardware to control the operation of the units and other elements of processor 110 and the transfer of data within, into, and out of processor 110. Processor control unit 115 may cause processor 110 to perform or participate in the performance of method embodiments of the present invention, such as the method embodiments described below, for example, by causing processor 110 to execute instructions received by instruction unit 111 and micro-instructions or micro-operations derived from instructions received by instruction unit 111.

Cache unit 116 may represent any one or more levels of cache memory in a memory hierarchy of information processing system 100, implemented in static random access memory or any other memory technology. Cache unit 116 may include any combination of cache memories dedicated to or shared among any one or more execution cores or processors within processor 110 according to any known approaches to caching in information processing systems.

Secure enclave unit 117 may represent any logic, circuitry, hardware, or other structures for creating and maintaining a secured, protected, or isolated environment, such as a secure enclave as described herein, in which an application or other software may run, execute, be loaded, or otherwise be present within an information processing system such as system 100. For purposes of this description, each instance of such an environment may be referred to as a secure enclave, although embodiments of the present invention are not limited to those using a secure enclave as the secured, protected, or isolated environment. In one embodiment, a secure enclave may be created and maintained using instructions in the instruction set of a processor in the Intel® Core® Processor Family or other processor family from Intel® Corporation.

Figure 2:
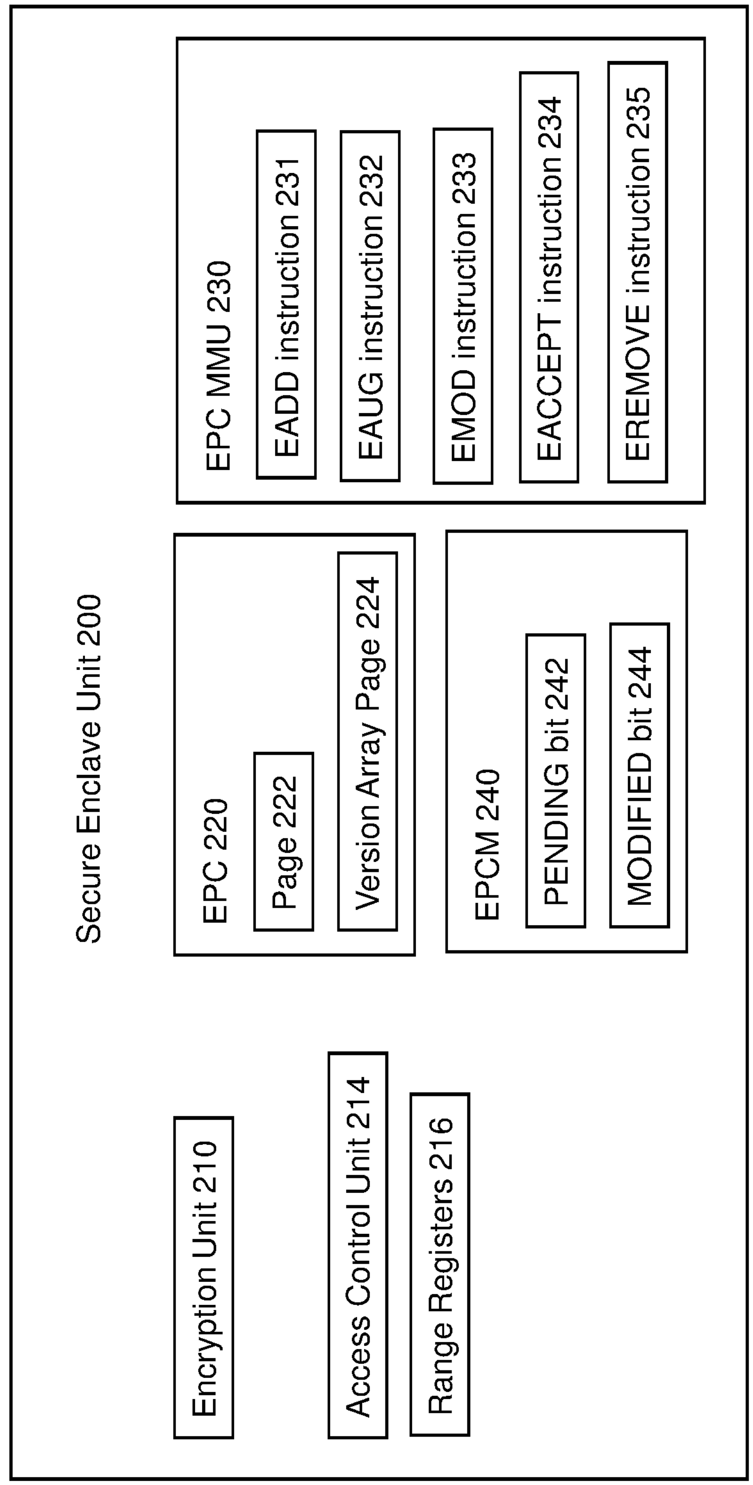
FIG. 2 illustrates a secure enclave unit according to an embodiment of the present invention.

FIG. 2 illustrates secure enclave unit 200, an embodiment of which may serve as secure enclave unit 117 in system 100. All or part of secure enclave unit 200 may be included within any one or more other units of processor 110, such as instruction unit 111, execution unit 112, processor storage 113, processor control unit 115, and cache unit 116.

Secure enclave unit 200 may include encryption unit 210, which may include any logic, circuitry, or other hardware to execute any one or more encryption algorithms and the corresponding decryption algorithms, and may include logic, circuitry, or other hardware shared with another encryption unit in processor 110.

Secure enclave unit 200 may also include enclave page cache (EPC) 220. In one embodiment, EPC 220 may be a dedicated portion of cache unit 116, such as a portion of a last level cache. Other embodiments are possible, including embodiments in which all or part of EPC 220 may be outside of processor 110. EPC 220 may be used to store unencrypted code and data for one or more secure enclaves. Access control logic 214, range register(s) 216, and EPC map (EPCM) 240 may be used to prevent access to a page within EPC 220 except by an application running on processor 110 within the secure enclave to which the page is allocated.

Secure enclave unit 200 may also include EPC memory management unit (MMU) 230. EPC MMU 230 may include any logic, circuitry, or other hardware to provide for managing the memory space of EPC 220 according to embodiments of the present invention. EPC MMU 230 may include microcode, logic, circuitry, and/or other hardware to decode and execute an EADD instruction 231, an EAUG instruction 232, an EMOD instruction 233, an EACCEPT instruction 234, and an EREMOVE instruction 235. These instructions may be used by an operating system and/or other software dynamically increase and decrease the size of the memory space in EPC 220 allocated to one or more secure enclaves.

EADD instruction 231 is a privileged instruction that may be used by an operating system to allocate a page in EPC 220 to a secure enclave. Unlike the allocation of a page using EAUG instruction 232, allocation of a page using EADD instruction 231 does not involve the acceptance of the allocation by the secure enclave using EACCEPT instruction 234. In other words, the state of page in EPC 220 may go directly from INVALID to VALID without going through a PENDING state, as described below in connection with the use of EAUG instruction 232.

EAUG instruction 232 is a privileged instruction that may be used by an operating system to allocate an unmeasured, zeroed page in EPC 220 to an existing secure enclave. Execution of EAUG instruction 232 causes a page to go from a VALID state to a PENDING state, as further described below.

EMOD instruction 233 is a privileged instruction that may be used by an operating system to modify the access rights or type associated with a previously allocated page in EPC 220. For example, EMOD instruction 232 may be used to give a PT_TRIM page type to a page in EPC 230 to indicate that the page cannot be accessed or modified again. Execution of EMOD instruction 233 causes a page to go from a VALID state to a MODIFIED state, as further described below.

EACCEPT instruction 234 is an unprivileged instruction that may be used by an application inside a secure enclave to confirm changes made to the access rights or type of a page in EPC 220. Execution of EACCEPT instruction 234 causes a page to go from a PENDING state or a MODIFIED state to a VALID state, as further described below.

EREMOVE instruction 235 is a privileged instruction that may be used by an operating system to de-allocate a page in EPC 220 from a secure enclave.

A newly allocated or modified page will not be accessible to the secure enclave until the changes are accepted using EACCEPT instruction 233. Changes to pages and acceptance of changes to pages are enforced using PENDING bit 242 and MODIFIED bit 244 in the entry for the page in EPCM 240. PENDING bit 242 is set by the execution of EAUG instruction 231 and cleared by the execution of EACCEPT instruction 233. While PENDING bit 244 is set, the page is in a PENDING state and cannot be accessed by the enclave and cannot be modified again by the operating system. MODIFIED bit 244 is set by the execution of EMOD instruction 232 and cleared by the execution of EACCEPT instruction 233. While MODIFIED bit 244 is set, the page is in a MODIFIED state cannot be accessed by the enclave and cannot be modified again by the operating system.

The use of EACCEPT instruction 233 ensures that an operating system cannot make unapproved changes to a secure enclave. Therefore, all changes to the memory for a secure enclave may have a root of trust in measured code in the secure enclave, and the integrity of data in the secure enclave may be protected. For example, the secure enclave itself, rather than the operating system, is responsible for preventing linear address aliasing.

Furthermore, EPC MMU 230 may include a state machine or other logic to ensure that an enclave cannot cause an operating system fault by failing to follow memory management protocols. Therefore, the operation of the operating system may be independent of the application running in a secure enclave. For example, the state machine may be designed to return an error instead of faulting in situations that are unavoidable.

FIG. 3 illustrates method 300 for memory management in secure enclaves according to an embodiment of the present invention. Although method embodiments of the invention are not limited in this respect, reference may be made to elements of FIGS. 1 and 2 to help describe the method embodiment of FIG. 3.

In box 310, creation of a secure enclave may begin, for example, by an operating system using an ECREATE instruction. In box 312, pages in EPC 220, including page 222, may be allocated to the secure enclave, for example, by the operating system using EADD instruction 231. In box 314, the secure enclave may be initiated, for example by the operating system using an EINIT instruction. In box 316, an application may enter the secure enclave, for example by using an EENTER instruction.

In box 320, the application in the secure enclave may determine that it needs more memory pages in EPC 220. In box 322, the application may request from the operating system more memory pages in EPC 220. In box 324, the operating system may use EAUG instruction 232 to allocate a page (e.g., page 222) to the secure enclave. In box 326, PENDING bit 242 in the page's entry in EPCM 240 is set.

In box 330, the application in the secure enclave may use EACCEPT instruction 234 to confirm the allocation. In box 332, PENDING bit 242 in the page's entry in EPCM 240 is cleared. In box 334, the page may be used by the application in the secure enclave, for example, on which to store data.

In box 340, the application in the secure enclave may determine that it no longer needs a page (e.g., page 222) in EPC 220. In box 342, the application may request the operating system to free the page. In box 344, the operating system may use EMOD instruction 233 to trim the page from the enclave's working set of pages, for example, by changing its page type to PT_TRIM. In box 346, MODIFIED bit 244 in the page's entry in EPCM 240 is set.

In box 350, the application in the secure enclave may use EACCEPT instruction 234 to confirm the modification. In box 352, MODIFIED bit 244 in the page's entry in EPCM 240 is cleared.

In various embodiments of the present invention, the method illustrated in FIG. 3 may be performed in a different order, with illustrated boxes combined or omitted, with additional boxes added, or with a combination of reordered, combined, omitted, or additional boxes. Furthermore, many other method embodiments are possible within the scope of the present invention.

Embodiments or portions of embodiments of the present invention, as described above, may be stored on any form of a machine-readable medium. For example, all or part of method 300 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for memory management in secure enclaves have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:

an instruction unit to receive a first instruction and a second instruction; and an execution unit to execute the first instruction, wherein execution of the first instruction includes allocating a first page in an enclave page cache to a secure enclave and setting a pending indicator in an entry for the first page in an enclave page cache map, wherein the first page is not accessible by the secure enclave while the pending indicator is set, and execution of the second instruction includes confirming the allocating of the first page and clearing the pending indicator.

2. The processor of claim 1, wherein the instruction unit is also to receive a third instruction and the execution unit is also to execute the third instruction, wherein execution of the third instruction includes de-allocating a second page in the enclave page cache from the secure enclave.

3. The processor of claim 2, wherein execution of the second instruction also includes confirming the de-allocating of the second page.

4. The processor of claim 3, wherein execution of the third instruction also includes setting a modified indicator in an entry for the second page in the enclave page cache map.

5. The processor of claim 4, wherein execution of the second instruction also includes clearing the modified indicator.

6. A method comprising:

receiving a first request from a secure enclave for more memory space in an enclave page cache;

receiving a first instruction from an operating system;

in response to receiving the first instruction, allocating a first page in the enclave page cache to the secure enclave;

in response to receiving the first instruction, setting a pending indicator in an entry for the first page in an enclave page cache map, wherein the first page is not accessible by the secure enclave while the pending indicator is set;

receiving a second instruction in connection with the first instruction from the secure enclave;

in response to receiving the second instruction in connection with the first instruction, confirming the allocating of the first page; and in response to receiving the second instruction in connection with the first instruction, clearing the pending indicator.

7. The method of claim 6, further comprising:

receiving a second request from a secure enclave to de-allocate a second page in the enclave page cache;

receiving a third instruction from the operating system; and in response to receiving the third instruction, de-allocating the second page.

8. The method of claim 7, further comprising:

receiving a second instruction in connection with the third instruction from the secure enclave; and in response to receiving the second instruction in connection with the third instruction, confirming the de-allocating of the second page.

9. The method of claim 8, further comprising, in response to receiving the third instruction, setting a modified indicator in an entry for the second page in an enclave page cache map.

10. The method of claim 9, further comprising, in response to receiving the second instruction in connection with the third instruction, clearing the modified indicator.

11. The method of claim 10, wherein the second page is not modifiable while the modified indicator is set.

12. A system comprising:

a memory; and a processor including an instruction unit to receive a first instruction and a second instruction; and an execution unit to execute the first instruction, wherein execution of the first instruction includes allocating a first page in an enclave page cache to a secure enclave and setting a pending indicator in an entry for the first page in an enclave page cache map, wherein the first page is not accessible by the secure enclave while the pending indicator is set, and execution of the second instruction includes confirming the allocating of the first page and clearing the pending indicator.

* * * * *